Figure 3:
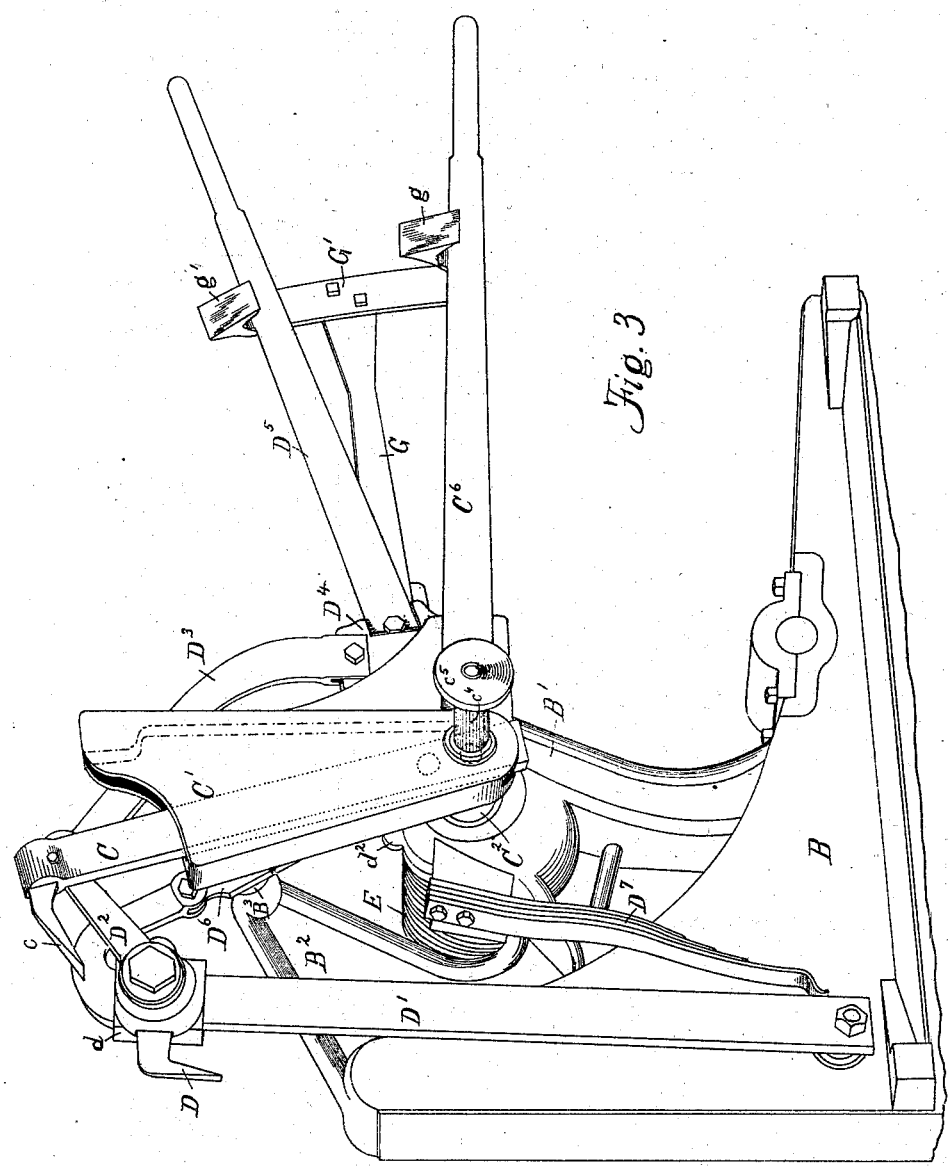

(No Model.)  W. M. WILKIN.  2 Sheets—Sheet 1.
SAWMILL DOG.
No. 559,427.  Patented May 5, 1896.
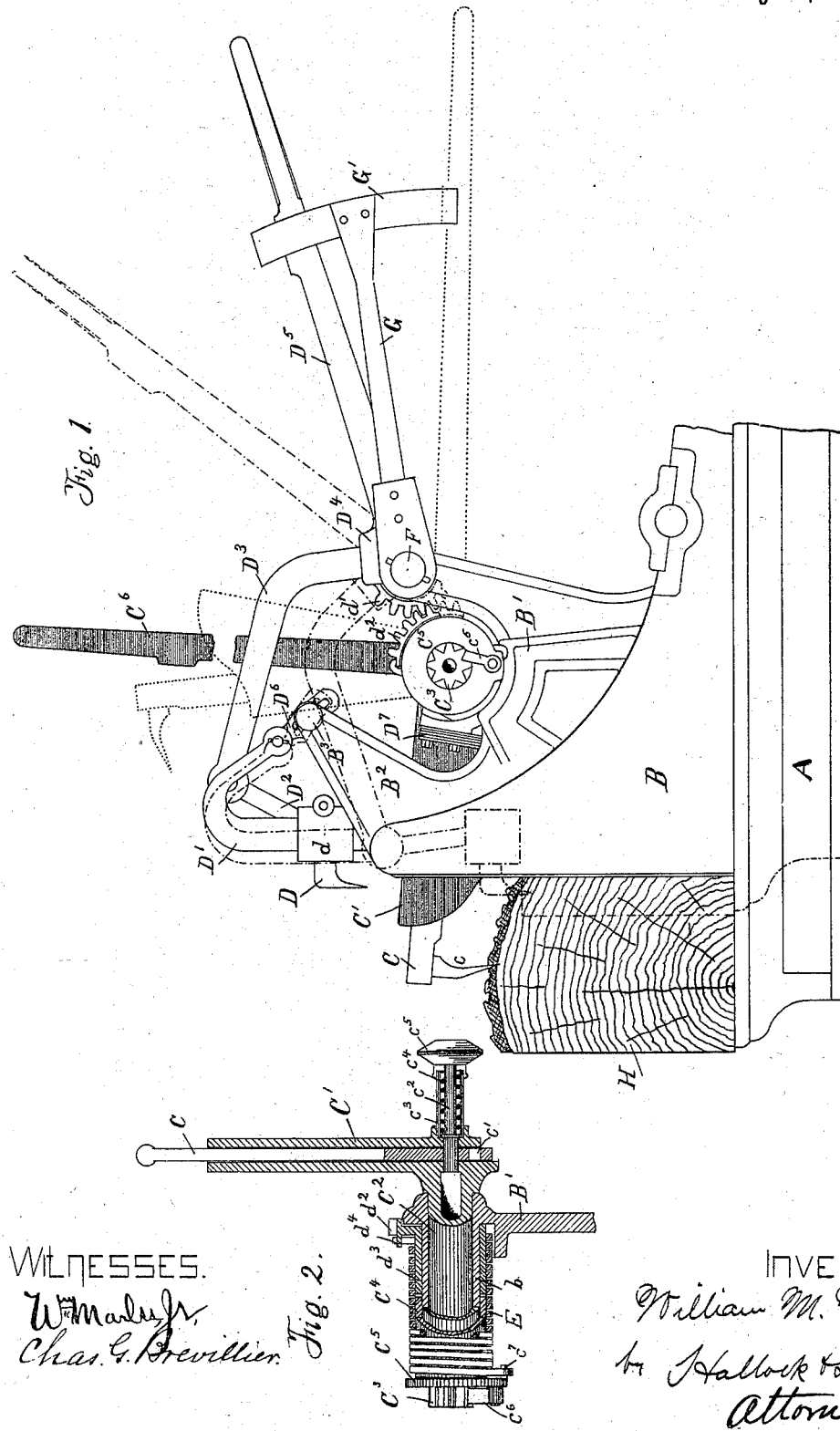
WITNESSES.  INVENTOR.

(No Model.)  W. M. WILKIN.  2 Sheets—Sheet 2.
SAWMILL DOG.

No. 559,427.  Patented May 5, 1896.

WITNESSES.  INVENTOR.

UNITED STATES PATENT OFFICE.

WILLIAM M. WILKIN, OF ERIE, PENNSYLVANIA.

SAWMILL-DOG.

SPECIFICATION forming part of Letters Patent No. 559,427, dated May 5, 1896.

Application filed April 8, 1895. Serial No. 544,940. (No model.)

*To all whom it may concern:*

Be it known that I, WILLIAM M. WILKIN, a citizen of the United States, residing at Erie, in the county of Erie and State of Pennsylvania, have invented certain new and useful Improvements in Sawmill-Dogs; and I do hereby declare the following to be a full, clear, and exact description of the invention, such as will enable others skilled in the art to which it appertains to make and use the same.

This invention relates to sawmill-dogs; and it consists in certain improvements in the construction thereof, as will be hereinafter fully described, and pointed out in the claims.

More particularly my invention relates to improvements in spring-actuated dogs, and is an improvement on the dog mechanism shown and described in United States Letters Patent granted to Edward H. Stearns, dated March 4, 1879, No. 213,002.

The invention is illustrated in the accompanying drawings as follows:

Figure 1 shows an end view of a carriage-frame with a side view of the head-block with the dog mechanism thereon. Fig. 2 shows a detail view, partly in section, of the spring-actuating mechanism. Fig. 3 shows a perspective view of the dog mechanism of the head-block at the opposite end of the carriage from that shown in Fig. 1, the dog mechanism in this instance being on the opposite side of the knee.

A marks the carriage-frame; B, the knee; B', the post on which is mounted the dog mechanism.

The log-dog $c$ is carried by the dog-bar C, and the dog-bar C is pivoted and swings in a hammer-sleeve C'. This hammer-sleeve is in turn operated by the spring-actuating mechanism and hand-levers similar in construction to the mechanism shown in the Stearns patent mentioned, and as my invention consists wholly in the introduction of the hammer-sleeve and details incident thereto a brief description of the actuating mechanism will suffice.

Extending from the post B' is a sleeve $b$. The shaft $C^2$, (see Fig. 2,) extending from the hammer-sleeve, is journaled in the sleeve $b$ and extends through it, terminating in a ratchet-wheel $C^3$ just outside the sleeve $b$. Journaled on the sleeve $b$ is a spring-sleeve $C^4$, having a disk $C^5$ at end thereof. The spring is coiled around this sleeve $C^4$ and secured at the end to a pin $C^7$ on the disk $C^5$. A ratchet-pawl is pivoted on the disk $C^5$ and engages the ratchet-wheel $C^3$, so that the tension of the spring is exerted upon the ratchet-wheel $C^3$, the shaft $C^2$, and the hammer-sleeve C', from which it is communicated to the log-dog $c$. The direction of force thus exerted by the spring is such as to drive the dog toward and into the log. A hand-lever $C^6$ extends from the hammer-sleeve, which, when drawn to the position shown in Fig. 3, can be placed under a catch $g$ on a plate $G^5$, which in turn is carried by an arm G, extending from and keyed to a stationary shaft mounted on an extension of the post B'.

The board-dog D is carried by the sliding block $d$, which sliding block is mounted on the pivoted bar D'. The sliding block is driven into the board and disengaged by the movement of an arm $D^3$, which is connected with the block by the link $D^2$ and is rigidly attached to a block $D^4$, which is journaled on the shaft F. The block $D^4$ has on its inner face the gear-segment $d'$, which meshes a gear-segment $d^2$, carried by the spring-sleeve $d^3$, which is journaled on the sleeve $b$. The spring E continues its coil from the sleeve $C^4$ over the sleeve $d^3$ and is attached at the end to the pin $d^4$ on the gear-segment $d^2$. By rotating the disk $C^5$ a few turns the spring E is tensioned and is locked by the pawl $c^6$. By following the movement of the parts it will be seen that the same spring E will exert a downward pressure on the log-dog, and also by reason of the introduction of the gear-segment exert a downward pressure on the board-dog. A slotted link $D^6$ is attached to the upper end of the bar D' and plays over a pin $B^3$ on an extension $B^2$ of the knee, and this play allows a slight pivotal movement of the bar D'. A spring $D^7$ presses this bar forward and the arm $D^3$ toward the limit of the backward throw draws it back. The hand-lever $D^5$ is attached to the block $D^4$ and can be passed under the catch $g$ to lock the board-dog up or out of the log. As the operation of the board-dog is the same as in the one shown by Stearns and forms no part of my invention, no further description is necessary.

When it is desired to operate the log-dog, the hand-lever is released. The force of the spring carries the dog forward and drives it into the log. To disengage the dog, the hand-lever is drawn back against the spring and placed under the catch $g$. In the Stearns device this tension of the spring was necessarily such as to drive the dog into the log, as described, at one blow. This sometimes required a greater tension than was convenient to be overcome with the lever when the dog was disengaged, especially when there was added the force necessary to withdraw the dog from the log. It is to overcome this difficulty that my invention particularly relates, and I accomplish the results desired by the use of the hammer-sleeve $C'$. In my device if the first blow does not seat the dog the hand-lever is drawn back the width of the sleeve and again released. By this operation a hammer-blow is delivered upon the dog, and this operation may be repeated until the dog is seated as desired. To release, the hand-lever may be drawn back quickly, and a blow or blows, as is necessary, may be delivered upon the dog from below, so that the sleeve in this instance acts as a jar with its well-known effect. The dogs in striking the log have a tendency to rebound. With the use of hammer-sleeve the force of the rebound is absorbed by the inertia of the sleeve, so that the dog itself does not leave the log; but the sleeve rebounds slightly and the spring bangs it back upon the dog-bar and so holds the dog-bit in its place. The sleeve $C'$ is of such size transversely as to form a guide for the dog-bar, and so strengthens it and prevents its bending. The bar is provided with a series of holes $c'$, through which is passed a pin $c^2$, which is carried by a case $c^3$. It is snapped into place by a spring $c^4$ and is provided with a handle $c^5$. If it is desired to change the length of the bar, the pin is withdrawn and the bar moved, as desired, and then snapped back into a hole at the new position.

What I claim as new is—

1. The combination with a sawmill-dog; of a swinging lever carrying said dog; a hammer pivoted to swing with said dog-carrying lever and to operate thereon by impact; a spring mechanism acting upon said hammer at the pivot for operating said hammer and dog in the forward direction; and a hand-lever for operating said hammer and dog in return movement.

2. The combination with a sawmill-dog; of a swinging lever carrying said dog; a hammer-sleeve inclosing said lever, pivoted concentrically therewith and arranged to operate upon said lever by impact; and a spring mechanism acting upon said hammer-sleeve at the pivot and arranged to drive the sleeve in a forward direction.

In testimony whereof I affix my signature in presence of two witnesses.

WILLIAM M. WILKIN.

Witnesses:
  H. C. LORD,
  WM. MARKS, Jr.